(12) United States Patent
Chen et al.

(10) Patent No.: US 7,664,187 B2
(45) Date of Patent: Feb. 16, 2010

(54) MEMORY REDUCTION IN DIGITAL BROADCAST RECEIVERS

(75) Inventors: Steven Chen, Cerritos, CA (US); Howard K. Luu, Temple City, CA (US)

(73) Assignee: SiRF Technology, Inc., San Jose, CA (US)

( * ) Notice: Subject to any disclaimer, the term of this patent is extended or adjusted under 35 U.S.C. 154(b) by 530 days.

(21) Appl. No.: 11/379,786

(22) Filed: Apr. 22, 2006

(65) Prior Publication Data

US 2007/0064821 A1    Mar. 22, 2007

Related U.S. Application Data

(60) Provisional application No. 60/674,479, filed on Apr. 25, 2005.

(51) Int. Cl.
H04L 27/28 (2006.01)
H04J 11/00 (2006.01)
G06F 15/00 (2006.01)

(52) U.S. Cl. .................. 375/260; 370/210; 708/404

(58) Field of Classification Search ......... 375/260–261, 375/340, 343; 370/208, 210; 708/403–405
See application file for complete search history.

(56) References Cited

U.S. PATENT DOCUMENTS

| 6,061,406 | A | * | 5/2000 | Carson et al. ............... 375/260 |
| 6,411,892 | B1 | | 6/2002 | Van Diggelen |
| 6,417,801 | B1 | | 7/2002 | Van Diggelen |
| 6,429,814 | B1 | | 8/2002 | Van Diggelen et al. |
| 6,453,237 | B1 | | 9/2002 | Fuchs et al. |
| 6,484,097 | B2 | | 11/2002 | Fuchs et al. |
| 6,487,499 | B1 | | 11/2002 | Fuchs et al. |
| 6,510,387 | B2 | | 1/2003 | Fuchs et al. |
| 6,542,820 | B2 | | 4/2003 | LaMance et al. |
| 6,560,534 | B2 | | 5/2003 | Abraham et al. |
| 6,606,346 | B2 | | 8/2003 | Abraham et al. |

(Continued)

OTHER PUBLICATIONS

Kevin Cousineau, "Fast Fourier Transform", Mar. 11, 2005, Provisional Application.*
Kuo, Jen-Chih "VLSI Desing of a Variable-Length FFT/IFFT Processor for OFDM-Based Communication Systems". In the EURASIP Journal on Applied Signal Processing, vol. 2003, Issue 13, p. 1306-1316.
PCT International Search Report, Mar. 21, 2008.

*Primary Examiner*—Khanh C Tran
(74) *Attorney, Agent, or Firm*—Thomas, Kayden, Horstemeyer & Risley, LLP

(57) ABSTRACT

An input random access memory (RAM) module of a fast Fourier transform (FFT) engine of a DVB receiver is used to store, during a first time period, delayed versions of an input signal that includes a first orthogonal frequency division multiplexed (OFDM) symbol and a cyclic prefix therefor received at the receiver, and samples for a second OFDM symbol to be demodulated using the FFT engine during a second time period. Delayed versions of the input signal are stored in the input RAM module of the FFT engine in a first-in-first-out (FIFO) fashion for signal acquisition and for FFT processing. Similarly, an output RAM module of the FFT engine is used to store moving averages of an autocorrelation of the input signal with its cyclic prefix computed over presumed guard intervals and over multiple symbols.

17 Claims, 5 Drawing Sheets

U.S. PATENT DOCUMENTS

| | | |
|---|---|---|
| 6,704,651 B2 | 3/2004 | Van Diggelen |
| 7,164,723 B2 * | 1/2007 | Sunwoo ..................... 375/260 |
| 2002/0137464 A1 | 9/2002 | Dolgonos et al. |
| 2003/0228892 A1 | 12/2003 | Maalismaa et al. |
| 2004/0100939 A1 | 5/2004 | Kriedte et al. |
| 2005/0251844 A1 * | 11/2005 | Martone et al. ............. 725/118 |
| 2006/0093023 A1 * | 5/2006 | Brown et al. ................ 375/219 |
| 2006/0248135 A1 * | 11/2006 | Cousineau et al. .......... 708/404 |

* cited by examiner

MEMORY REDUCTION IN DIGITAL BROADCAST RECEIVERS

CROSS-REFERENCE TO RELATED APPLICATIONS

The present application is a NONPROVISIONAL and claims the priority benefit of U.S. Provisional Application No. 60/674,479, entitled "Memory Reduction in Digital Video Broadcast Receivers," filed Apr. 25, 2005, assigned to the assignee of the present invention and incorporated herein by reference.

FIELD OF THE INVENTION

This invention relates to the field of wireless receivers and, in particular, to methods and systems for reducing the amount of physical memory space required in such receivers for performing various operations such as acquisition and demodulation of digital video broadcast signals.

BACKGROUND

The digital television broadcast standard promulgated by the European Telecommunications Standards Institute (ETSI) includes both the digital video broadcast-handheld (DVB-H) standard and the digital video broadcast-terrestrial (DVB-T) standard. Those standards will be referred to herein collectively as the DVB standard. The DVB standard specifies various modulation and channel coding techniques to be used for digital television broadcasting. According to the DVB standard, MPEG-2 video streams are transmitted using digital modulation techniques known as Orthogonal Frequency Division Multiplexing (OFDM). In OFDM systems, the transmitted data modulates multiple subcarrier frequencies rather than a single carrier. Typical subcarrier modulation schemes include Bi-Phase Shift Keying (BPSK), Quadrature Phase Shift Keying (QPSK), or Quadrature Amplitude Modulation (QAM).

OFDM's parallel transmission of data over multiple simultaneous carriers provides a measure of protection against frequency-selective fading. Thus, while some carriers may be degraded, others will be unaffected. The portion of data transmitted on a given subcarrier is known as a "symbol," and each symbol has a duration known as a "symbol period." To reduce intersymbol interference, each modulation symbol period for each subcarrier is extended by a guard interval. Typically, the contents of the guard interval is a "cyclic prefix" of data repeated from the end of the active symbol period.

Before transmission, the MPEG-2 transport multiplex packets are scrambled, Reed-Solomon encoded, convolutionally byte-wise interleaved (outer interleaver), then convolutionally encoded. After convolution coding, the data is partitioned into v-bit sub-streams, and each sub-stream is bit- and symbol-interleaved, then mapped into the signal constellation.

On the receiver side, the received v-bit words are deinterleaved by symbol- and bit-deinterleavers. A Viterbi decoder corrects bit-wise errors, then the data stream is deinterleaved by a convolution deinterleaver. Byte-wise errors are corrected by a Reed-Solomon decoder. Finally a descrambler restores the original MPEG-2 transport multiplex packets.

Additional information regarding the DVB standard can be found in the literature including Laszlo Horvath et al, "A Novel, High-Speed Reconfigurable Demapper—Symbol Deinterleaver Architecture for DVB-T", 1999 IEEE publication no. 0-7803-5471-0/99 and references cited therein. That paper purports to present a memory reduction technique in which the memory associated with the symbol de-interleaver is eliminated by optimizing for memory following the demapper. However, optimizing for memory following the de-mapper only solves a localized problem. It does not address the problem of the significant amount of memory space required for the overall demodulation function.

SUMMARY OF THE INVENTION

In accordance with an embodiment of the present invention, a input random access memory (RAM) module of a fast Fourier transform (FFT) engine of a receiver is used to store, during a first time period, delayed versions of an input signal that includes a first orthogonal frequency division multiplexed (OFDM) symbol and a cyclic prefix therefor received at the receiver, and samples for a second OFDM symbol to be demodulated using the FFT engine during a second time period. For example, the delayed versions of the input signal may be stored in the input RAM module of the FFT engine in a first-in-first-out (FIFO) fashion for signal acquisition initially and then for FFT processing after the signal has been acquired. Similarly, an output RAM module of the FFT engine may be used to store moving averages of an autocorrelation of the input signal with its cyclic prefix computed over one or more presumed guard intervals thereof and over multiple symbols. More generally, intermediate signal processing results obtained during acquisition of the input signal are stored in the output RAM module of the FFT engine, which output RAM module is also used to store an FFT of the input signal computed by the FFT engine.

The input signal has a duration of an active symbol period and a guard interval while the cyclic prefix has a duration of the guard interval. The guard interval may be determined by, for each of a plurality of possible guard intervals: selecting one of the plurality of possible guard intervals; delaying the input signal by a difference between the total period and a corresponding selected guard interval; storing the delayed signal in the input RAM module; calculating a moving window average of an autocorrelation for the delayed signal over the selected guard interval; normalizing the moving window average by its power; storing the normalized moving window average in an output RAM module of the FFT engine; and determining the guard interval and the symbol timing based on the normalized moving window average from a plurality of stored, normalized, moving window averages.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The present invention is illustrated by way of example, and not limitation, in the figures of the accompanying drawings, in which.

DETAILED DESCRIPTION

Figure 1:
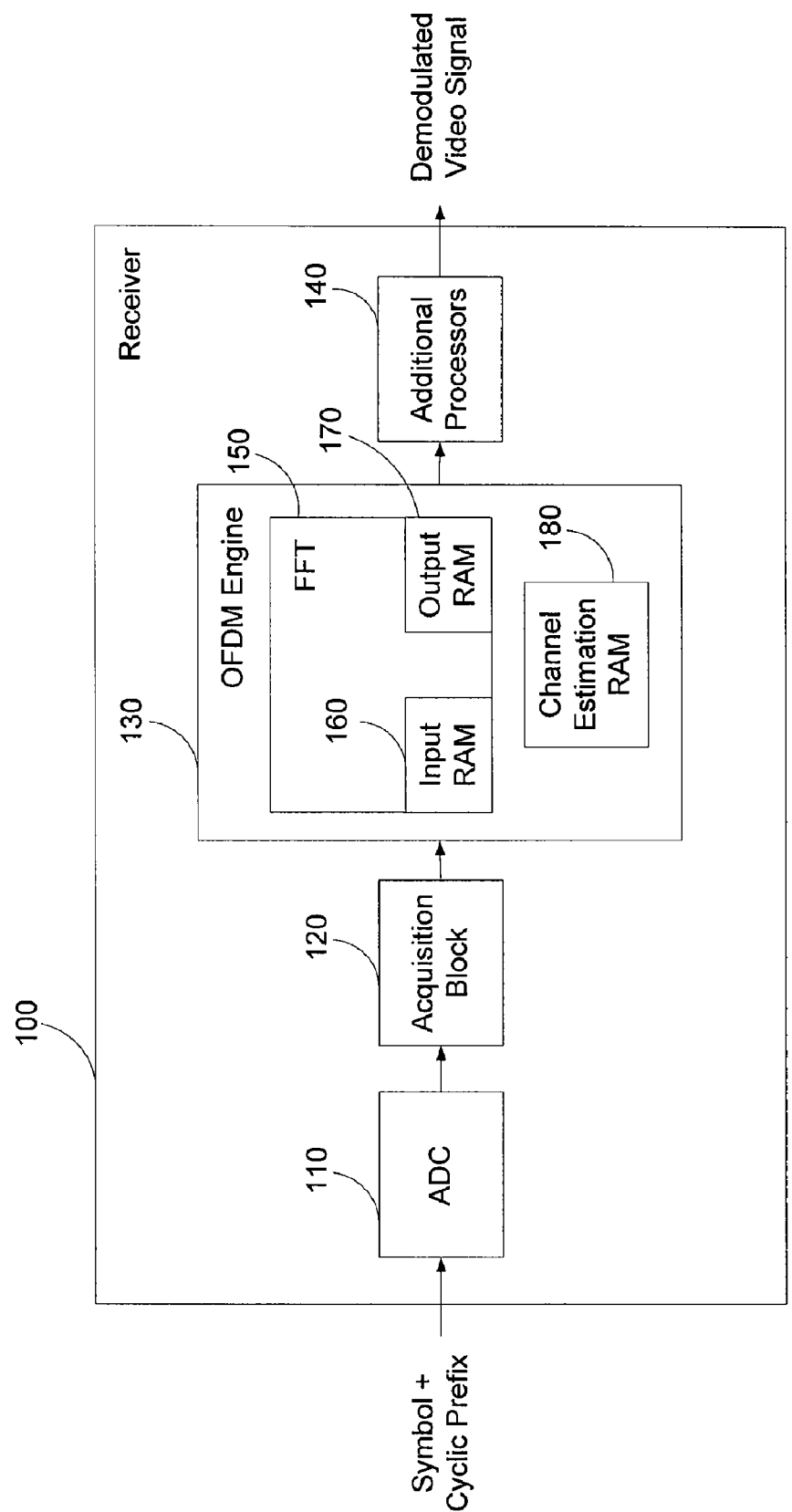
FIG. 1 depicts a block diagram of a receiver configured in accordance with methods and systems consistent with the present invention.

Described herein are techniques for reducing the amount of physical memory space required in order to implement operations involving acquisition and demodulation of the OFDM signal structure within a DVB receiver. The present techniques take a global approach to memory optimization of the DVB receiver by integrating memory space used for signal acquisition with memory space used to implement Fast Fourier Transform (FFT) algorithms. In one embodiment of the present invention, memory space previously allocated exclusively for FFT operations in OFDM demodulation is reused/re-tasked for other receiver operations. For example, such memory space may be allocated for use in connection with an autocorrelation function and/or parallel time search function for initial signal acquisition in addition to its use for FFT operations.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer-based device, selectively activated or reconfigured by a computer program stored therein. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer-based device or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

In accordance with methods consistent with the present invention, a method is provided for demodulating a signal in a receiver. The receiver includes an OFDM engine, configured, in part, to perform FFT operations. The portion of the OFDM engine so configured will be referred to herein as an FFT engine. It should, however, be appreciated that the OFDM engine and/or the FFT engine may be implemented using general purpose programmable devices, such as microprocessors, digital signal processors and the like, specially configured application specific integrated circuits (ASICs), appropriately programmed field programmable gate arrays (FPGAs) or other similar devices. Further, in some cases the OFDM engine and FFT engine will share hardware components.

The FFT engine includes an input random access memory (RAM) and an output RAM, and the OFDM engine includes a channel estimate RAM. In accordance with the present methods symbols making up the received signal are stored in the input RAM; the FFT of that input signal is computed; and the resulting FFT of the input signal is stored in the output RAM. Thereafter, de-interleaving the FFT of the input signal may be performed as the FFT of the input signal is read out of the output RAM, for example using a de-interleaving permutation function.

Referring now to FIG. 1, a block diagram of a receiver 100 configured in accordance with methods and systems consistent with the present invention is shown. The receiver 100 includes an analog to a digital converter (ADC) 110, an acquisition block 120, an OFDM engine 130, and additional processors 140. The OFDM engine 130 includes an FFT engine 150. The FFT engine 150 includes an input RAM 160 and an output RAM 170, and the OFDM engine further includes a channel estimation RAM 180. In one implementation, the FFT engine's input RAM 160 includes four 2048×32 and four 3072×32 RAM modules, the output RAM 170 includes four 2048×42 RAM modules, and the channel estimation RAM 180 includes a 2304×32 RAM module.

The ADC 110 initially digitizes the received signal, which includes a symbol and a cyclic prefix. The acquisition block 120 receives the digitized version of the input signal from ADC 110 and removes the cyclic prefix therefrom. The resulting digitized symbol is provided as an input to the OFDM engine 130, where the FFT engine 150 calculates the Fast Fourier Transform of the digitized symbol. That FFT of the digitized symbol is then applied as an input to the additional processors 140 (e.g., to reverse the interleaving and encoding that occurs at the transmitter) to obtain the demodulated video signal.

Figure 2:
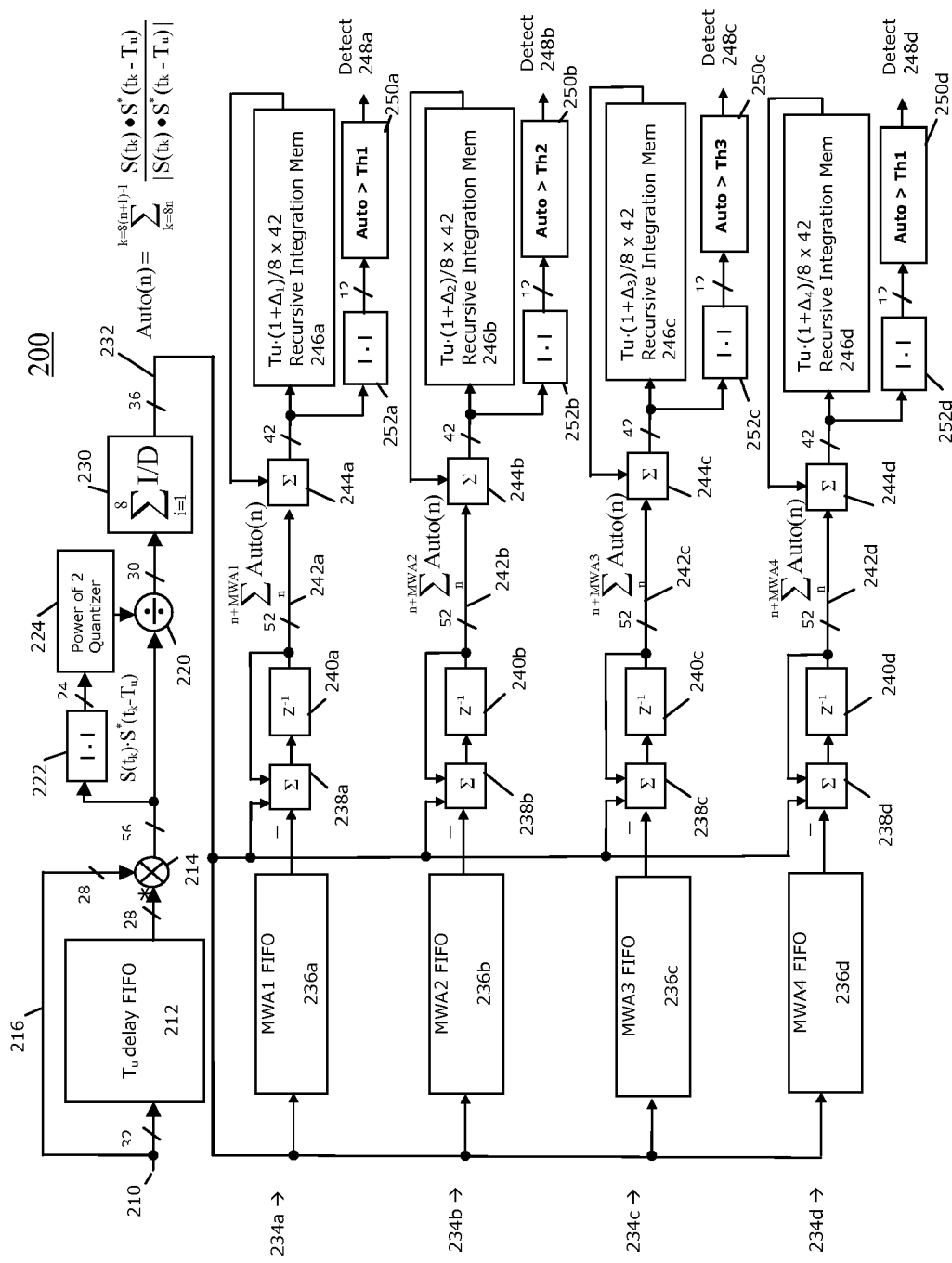
FIG. 2 depicts a block diagram of the initial acquisition function in accordance with methods and systems consistent with the present invention.

FIG. 2 depicts a block diagram of the initial acquisition function 200 according to an illustrative embodiment of the present invention. As shown, the initial acquisition for symbol timing is performed through auto-correlation of the cyclic prefix. The autocorrelation is performed by doing a complex multiplication of a current sample with the conjugate of a delayed version of prior samples, normalizing the multiplication result by its magnitude quantized to power of 2, and then performing an integrate-and-dump of multiple such normalized results over eight samples.

Initially, input samples 210 (which include symbols and their respective cyclic prefixes) are delayed by the symbol period, $T_u$, by storing the samples for the delay period in a FIFO memory 212 (e.g., which may be configurable to 8192× 32, 4096×32 or 2084×32). In one embodiment, the FIFO memory may be realized using four 2K×32 FFT Input RAMs. These delayed samples are complex conjugated multiplied 214 with un-delayed versions of the samples 216. The multiplication results 218 are then normalized 220 by magnitude values of said results 222 quantized to power of 2 224 to produce normalized values 226. The normalized values 226 are then subject to an integrate-and-dump process 230 over eight samples to produce the autocorrelation results 232.

Since there is no a priori knowledge of $T_u$ or the guard interval ≠, a search algorithm to search through all possible combinations of $T_u$ and $\Delta$ is required. Stated differently, because the symbol duration is $T_u+\Delta$, the search aperture needs to cover this amount of timing uncertainty. In the present instance this search algorithm is implemented using moving window average (MWA) computation paths 234a, 234b, 234c, 234d, over each of the four possible values of the guard interval ($T_u/4$, $T_u/8$, $T_u/16$, and $T_u/32$). Since the integrate-and-dump operation has already decimated the autocorrelation results by 8, the moving window average computation paths only need to average over $\frac{1}{8}^{th}$ as many samples as are normally found in a given $\Delta$. In one embodiment of the present invention, the moving window average computation paths make use of the FFT Output RAM as a $\Delta/8$ deep shift register.

For each of the MWA computation paths 234a-234d, the autocorrelation results 232 are stored in a respective MWA FIFO 236a-236d. The FIFO outputs are subtracted 238a-238d from the sum of the autocorrelation results 232 and delayed 240a-240d versions of such results to produce, in each respective computation path, moving window averaged autocorrelation results 242a-242d.

The moving window averaged autocorrelation results 242a-242d are then recursively integrated 244a-244d over multiple OFDM symbols. Each OFDM symbol is $T_u+\Delta$ long and for the decimation by 8 of the input samples, $(T_u+\Delta)/8$ storage locations in each storage register 246a-246d are needed for the recursive integration, one for each of the 4 $\Delta$ values. These registers may be implemented using the four 2K×42 FFT Output RAMs discussed above.

For each of the four parallel computation paths 234a, 234b, 234c, 234d, a symbol time decision 248a-248d (i.e., the determined value of $T_u$) is based on the earliest time that the respective moving window averaged autocorrelation result exceeds a threshold 250a-250d determined from the power 252a-252d of the samples. Detection is declared when one of the moving window autocorrelation results exceeds its respective threshold.

Figure 3:
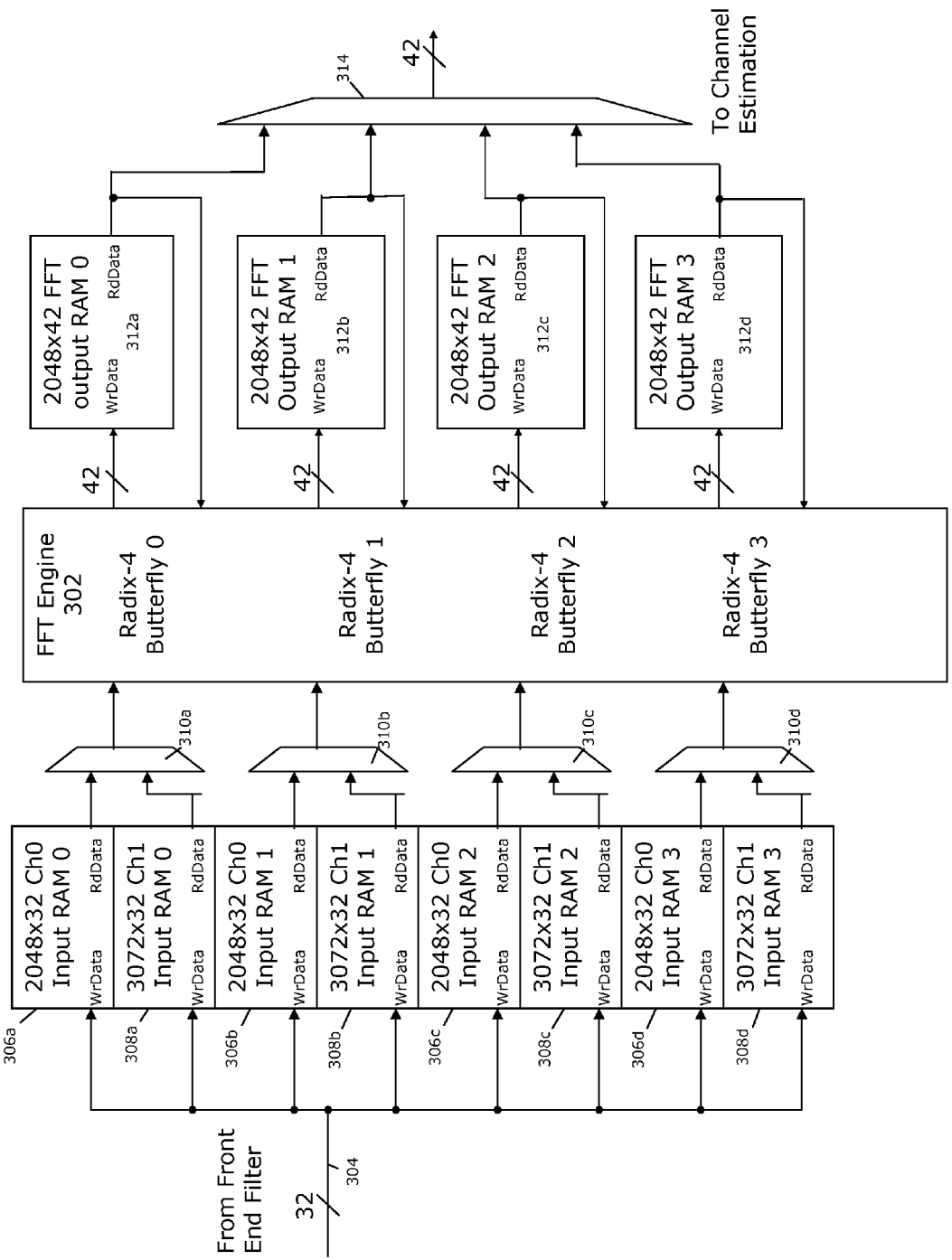
FIG. 3 depicts a block diagram of the FFT architecture in accordance with methods and systems consistent with the present invention.

FIG. 3 depicts a block diagram of an FFT architecture 300 according to an illustrative embodiment of the present invention. The FFT of the input symbol samples are computed using four parallel radix-4 butterflies of an FFT engine 302 to accelerate the processing. After the input samples 304 for a complete symbol are stored in the four 2048×32 or 3072×32 input RAM modules 306a-306d or 308a-308d (which collectively make up the FFT input RAM 160 illustrated in FIG. 1), FFT processing by the four butterflies is initiated. Inputs to the butterflies from the various input RAMs are selected via multiplexers 310a-310d. While the butterflies are processing the stored symbol, the samples from the current symbol are also stored into the Input RAM, thus allowing FFT computation of the previous symbol and symbol storage of the current symbol to proceed simultaneously.

The four 2048×42 output RAM modules 312a-312d (which collectively make up the FFT output RAM 170 illustrated in FIG. 1) are used to store the intermediate results from each stage of the FFT computation and also to store the final FFT output. After the final FFT output is read out for processing by the subsequent processors (via multiplexer 314), the FFT computation is then repeated for the next symbol.

Figure 4:
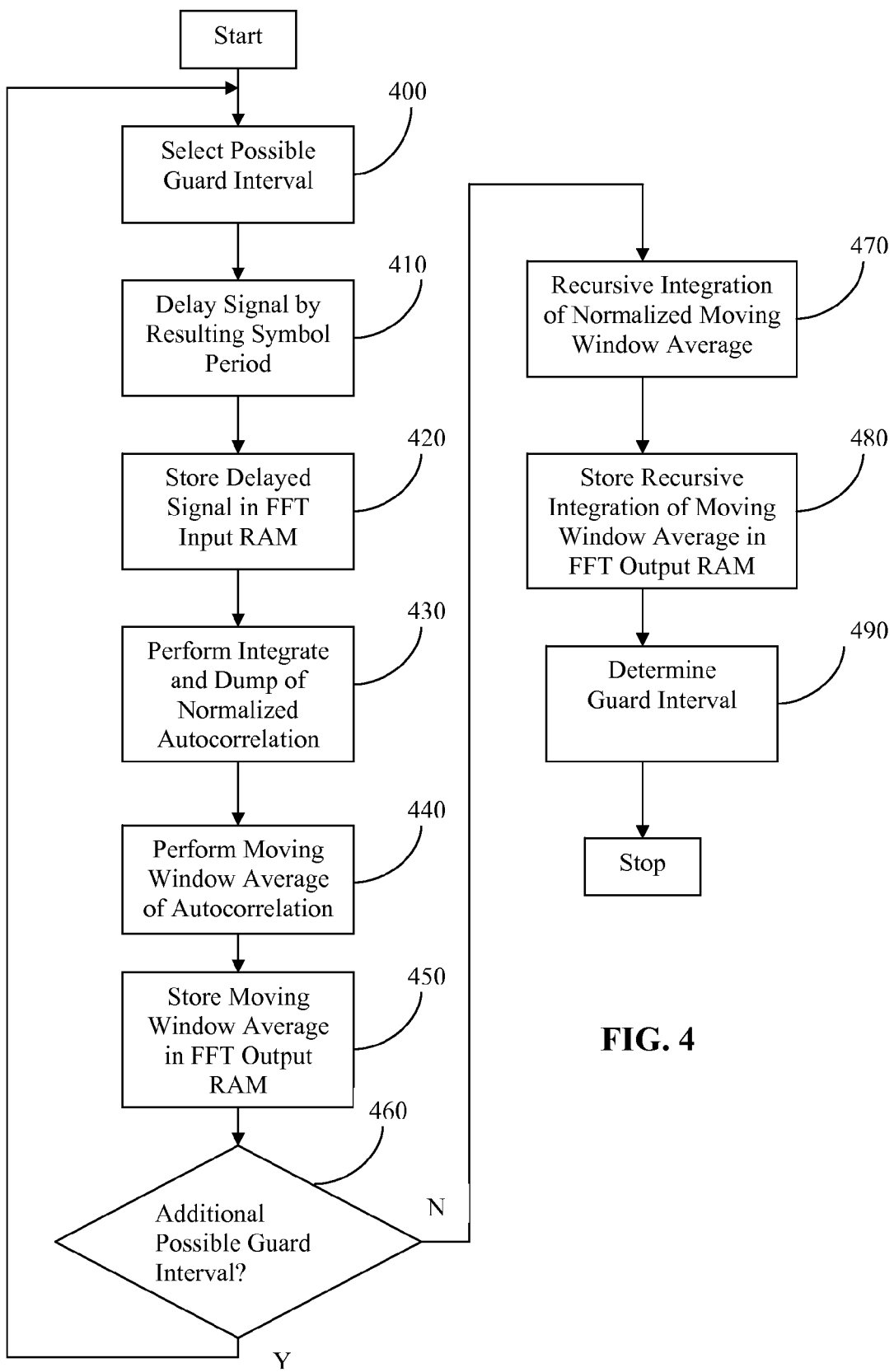
FIG. 4 is a flow chart illustrating the operation of the acquisition block of a receiver configured in accordance with methods and systems consistent with the present invention.

The flow chart of FIG. 4 illustrates the steps performed by the acquisition block 120 depicted in FIG. 1. Initially, the acquisition block 120 receives a signal that includes a symbol and a cyclic prefix, and searches for the cyclic prefix in the guard interval $\Delta$. This is accomplished through autocorrelation of the cyclic prefix with the same data pattern at the end of the symbol period $T_u$. Since there is no a priori knowledge of $T_u$ or the guard interval $\Delta$, the search algorithm will search through all possible combinations of $T_u$ and $\Delta$. Thus, the acquisition block 120 first selects one of a number of possible guard intervals (step 400).

The acquisition block 120 then delays the signal by the resulting symbol period (i.e., the difference between the total period and the guard interval, where the total period is the duration of the symbol and cyclic prefix) (step 410), and stores the delayed signal in the FFT engine input RAM (step 420). The acquisition block 120 next performs an autocorrelation of the stored $T_u$-delayed sample with the current sample, normalizes it, and integrates and dumps every 8 such normalized autocorrelation (step 430). The acquisition block 120 then performs a moving window average over the presumed $\Delta$ of the normalized autocorrelation (step 440).

The acquisition block 120 stores these moving averages in the FFT output RAM (step 450). Multiple moving window averages are required to cover the time uncertainty within a symbol time of $T_u+\Delta$. Furthermore, the moving window averages are recursively integrated over multiple symbols. The acquisition block 120 determines whether there are any other possible guard intervals (step 460), and performs steps 400 through 450 for all possible guard intervals.

The acquisition block 120 then determines the recursive integration of the normalized moving window averages (step 470), and stores these normalized moving window averages also in the FFT output RAM (step 480). Based on these normalized moving window averages, the acquisition block 120 determines the true guard interval Δ (step 490).

The present invention thus takes advantage of the existing memories in the FFT engine for storing intermediate, moving window averages results associated with the initial signal acquisition. This approach also allows for parallel search of all four possible Δ for a given $T_u$, reducing search time and power consumption. In one implementations, the 4 2048×32 FFT input RAM modules are reconfigured as an 8K deep first-in-first-out (FIFO) queue to delay the received samples by $T_u$. The 4 2048×42 FFT output RAM modules are used to store the multiple recursively integrated moving window averages and the moving window averages themselves of the normalized autocorrelation covering the symbol time uncertainty over multiple symbols over all four possible value of Δ. In order to optimize the memory usage, the autocorrelation are quantized to 8 samples in the baseline architecture before being integrated in the moving window average. This quantization interval of 8 can be reduced in the 4K/2K mode if finer search time granularity is desired.

Figure 5:
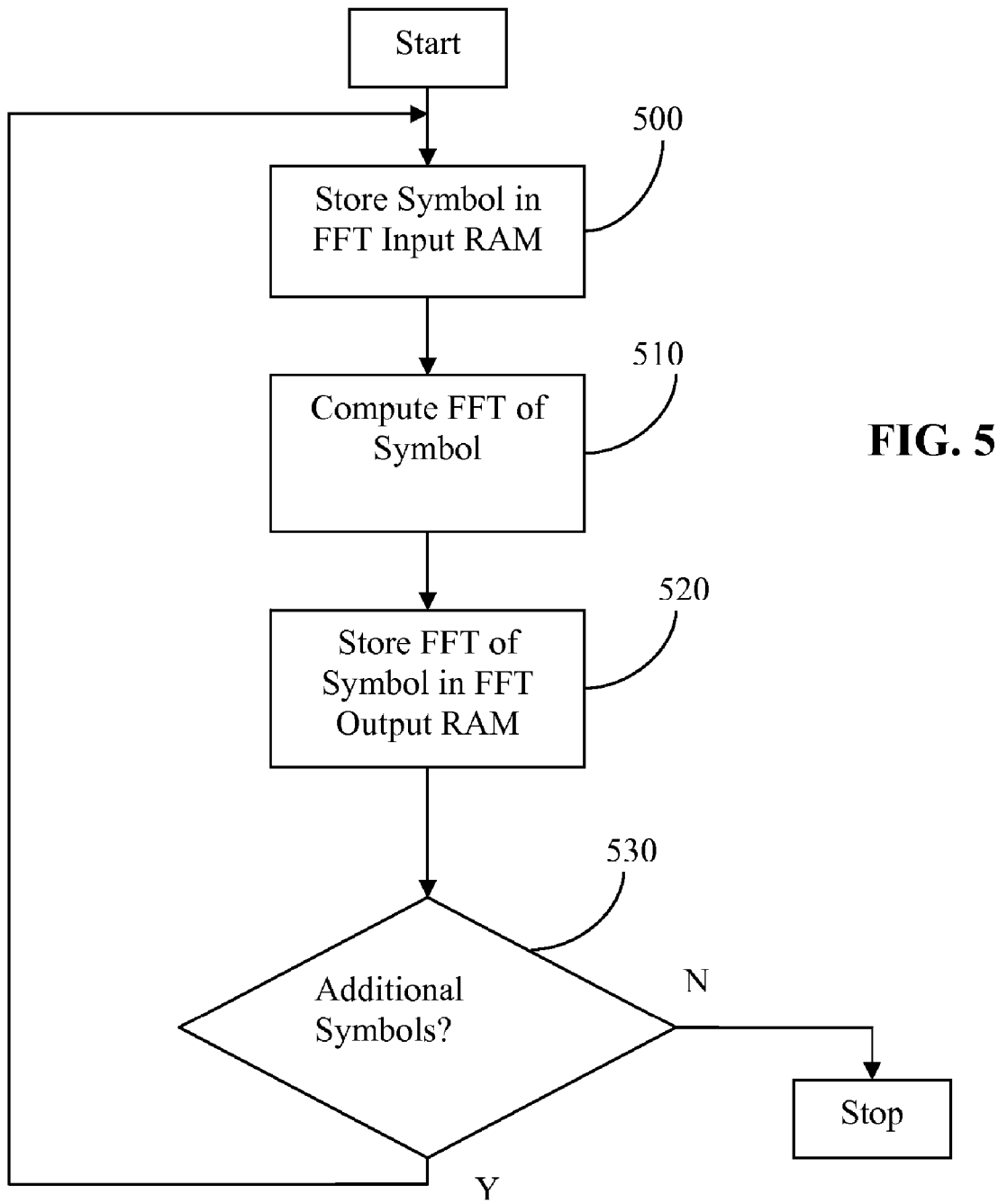
FIG. 5 is a flow chart illustrating the operation of the OFDM engine of a receiver configured in accordance with methods and systems consistent with the present invention.

The flow chart of FIG. 5 illustrates the steps performed by the OFDM engine 130 depicted in FIG. 1. The OFDM engine stores a symbol in the FFT input RAM (step 500). The FFT engine computes the FFT of the current symbol (step 510), and stores that result to the output RAM (step 520).

The OFDM engine then determines whether there are any additional symbols to analyze (step 530). If there are additional symbols to analyze, the OFDM engine returns to step 500 and performs the analysis with the next received symbol.

The invention as described above optimizes power consumption in the initial acquisition and the FFT operations of the OFDM demodulation in a DVB receiver by optimizing for memory and processing requirements. It is believed that the parameters of memory and processing requirements can be traded off one against the other, such as by increasing the physical memory size in exchange for a lower processing requirement. Performing such an engineering tradeoff will be understood to be within the scope of the present invention. The invention could also be used for reception of signals according to standards other than DVB, provided that such signals are sufficiently similar to the DVB signals to make the structures and methods disclosed herein applicable to those other types of signals as well.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the program may be executed in an different order than described above, and additional processing steps may be incorporated. The invention may be implemented with both object-oriented and non-object-oriented programming systems. The scope of the invention is defined by the claims and their equivalents.

What is claimed is:

1. A method comprising:
    sharing an input random access memory (RAM) module of a fast Fourier transform (FFT) engine of a receiver so as to store, during a period of signal acquisition, delayed versions of an input signal including a first orthogonal frequency division multiplexed (OFDM) symbol and a cyclic prefix therefor received at the receiver, and samples for a second OFDM symbol to be demodulated using the FFT engine after the period of signal acquisition: and
    storing, in an output RAM module of the FFT engine, moving window averages of an autocorrelation of the input signal computed over one or more presumed guard intervals thereof.

2. The method of claim 1, further comprising storing, in the output RAM modules of the FFT engine, recursive integration over multiple symbols of the moving window averages of the input signal computed over the one or more presumed guard intervals.

3. A method comprising:
    sharing an input random access memory (RAM) module of a fast Fourier transform (FFT) engine of a receiver so as to store, during a period of signal acquisition, delayed versions of an input signal including a first orthogonal frequency division multiplexed (OFDM) symbol and a cyclic prefix therefor received at the receiver, and samples for a second OFDM symbol to be demodulated using the FFT engine after the period of signal acquisition; and
    storing intermediate signal processing results obtained during acquisition of the input signal in an output RAM module of the FFT engine.

4. The method of claim 3, further comprising storing, in the output RAM of the FFT engine, an FFT of the input signal computed by the FFT engine.

5. A method comprising:
    sharing an input random access memory (RAM) module of a fast Fourier transform (FFT) engine of a receiver so as to store, during a period of signal acquisition, delayed versions of an input signal including a first orthogonal frequency division multiplexed (OFDM) symbol and a cyclic prefix therefor received at the receiver, and samples for a second OFDM symbol to be demodulated using the FFT engine after the period of signal acquisition,
    wherein the input signal has a duration comprising a total period and the cyclic prefix has a duration comprising a guard interval, the method further comprising determining the guard interval.

6. The method of claim 5, wherein determining the guard interval comprises, for each of a plurality of possible guard intervals: selecting one of the plurality of possible guard intervals; delaying the input signal by a difference between the total period and a corresponding selected guard interval; storing the delayed signal in the input RAM module; calculating a moving window average of an autocorrelation for the delayed signal over the selected guard interval; storing the moving window average in an output RAM module of the FFT engine; storing the recursive integration of the moving window average in an output RAM module of the FFT engine; determining a first recursively integrated moving window average from a plurality of stored recursively integrated moving window averages; and determining the guard interval based on the first recursively integrated moving window average.

7. The method of claim 5, wherein the delayed versions of the input signal are stored in the input RAM module of the FFT engine in a first-in-first-out (FIFO) fashion.

8. A receiver comprising:
    an input random access memory (RAM) coupled to a signal acquisition module of the receiver so as to store, while acquiring a signal, delayed versions of an input signal including a first orthogonal frequency division multiplexed (OFDM) symbol and a cyclic prefix therefor received at the receiver, and samples for a second OFDM symbol to be demodulated using a fast Fourier transform (FFT) engine of the receiver during a after the signal is acquired; and an output RAM coupled to the FFT engine so as to store moving window averages of an autocorrelation of the input signal computed over one or more presumed guard intervals thereof.

9. The receiver of claim 8, wherein the output RAM is further coupled to the FFT engine so as to store recursive integration results of the moving window averages of the input signal computed over the one or more presumed guard intervals.

10. A receiver comprising:
an input random access memory (RAM) coupled to a signal acquisition module of the receiver so as to store, while acquiring a signal, delayed versions of an input signal including a first orthogonal frequency division multiplexed (OFDM) symbol and a cyclic prefix therefor received at the receiver, and samples for a second OFDM symbol to be demodulated using a fast Fourier transform (FFT) engine of the receiver during a after the signal is acquired: and an output RAM coupled to the FFT engine so as to store intermediate signal processing results obtained during acquisition of the input signal at the receiver.

11. The receiver of claim 10, wherein the output RAM is further coupled to the FFT engine so as to store an FFT of the input signal computed by the FFT engine.

12. A receiver comprising:
a fast Fourier transform (FFT) engine including an input random access memory (RAM) module;
a signal acquisition module; and
a demodulator;
wherein the signal acquisition module is configured to store, during an acquisition period, in the input RAM module of the FFT engine, a delayed version of an input signal including a first orthogonal frequency division multiplexed (OFDM) symbol and a cyclic prefix therefor received at the receiver,
wherein the FFT engine is configured to store, in the input RAM module of the FFT engine, samples of a second OFDM symbol from the input signal, and
wherein the demodulator is configured to use the FFT engine, during a time period other than the acquisition period, to demodulate the second OFDM sample stored in the input RAM module of the FFT engine,
wherein the FFT engine further includes an output RAM module, and wherein the signal acquisition module is further configured to store, in the output RAM module of the FFT engine, moving window averages of an auto-correlation of the input signal computed over one or more presumed guard intervals thereof.

13. The receiver of claim 12, wherein the delayed version of the input signal is stored in the input RAM module of the FFT engine in a first-in-first-out (FIFO) fashion.

14. The receiver of claim 12, wherein the signal acquisition module is further configure to store, in the output RAM module of the FFT engine, recursive integration over multiple symbols of the moving window averages of the input signal computed over the one or more presumed guard intervals.

15. A receiver comprising:
a fast Fourier transform (FFT) engine including an input random access memory (RAM) module;
a signal acquisition module; and
a demodulator;

wherein the signal acquisition module is configured to store, during an acquisition period, in the input RAM module of the FFT engine, a delayed version of an input signal including a first orthogonal frequency division multiplexed (OFDM) symbol and a cyclic prefix therefor received at the receiver,
wherein the FFT engine is configured to store, in the input RAM module of the FFT engine, samples of a second OFDM symbol from the input signal, and
wherein the demodulator is configured to use the FFT engine, during a time period other than the acquisition period, to demodulate the second OFDM sample stored in the input RAM module of the FFT engine,
wherein the FFT engine further includes an output RAM module, and wherein the signal acquisition module is further configured to store intermediate signal processing results obtained during the acquisition period in the output RAM module of the FFT engine.

16. A receiver comprising:
a fast Fourier transform (FFT) engine including an input random access memory (RAM) module;
a signal acquisition module; and
a demodulator;
wherein the signal acquisition module is configured to store, during an acquisition period, in the input RAM module of the FFT engine, a delayed version of an input signal including a first orthogonal frequency division multiplexed (OFDM) symbol and a cyclic prefix therefor received at the receiver,
wherein the FFT engine is configured to store, in the input RAM module of the FFT engine, samples of a second OFDM symbol from the input signal, and
wherein the demodulator is configured to use the FFT engine, during a time period other than the acquisition period, to demodulate the second OFDM sample stored in the input RAM module of the FFT engine,
wherein the input signal has a duration comprising a total period and the cyclic prefix has a duration comprising a guard interval, and the signal acquisition module is further configured to determine the guard interval.

17. A receiver comprising:
a fast Fourier transform (FFT) engine including an input random access memory (RAM) module;
a signal acquisition module; and
a demodulator;
wherein the signal acquisition module is configured to store, during an acquisition period, in the input RAM module of the FFT engine, a delayed version of an input signal including a first orthogonal frequency division multiplexed (OFDM) symbol and a cyclic prefix therefor received at the receiver,
wherein the FFT engine is configured to store, in the input RAM module of the FFT engine, samples of a second OFDM symbol from the input signal, and
wherein the demodulator is configured to use the FFT engine, during a time period other than the acquisition period, to demodulate the second OFDM sample stored in the input RAM module of the FFT engine,
wherein the input signal has a duration comprising a total period and the cyclic prefix has a duration comprising a guard interval, and the signal acquisition module is further configured to determine the guard interval by:
selecting one of the plurality of possible guard intervals;
delaying the input signal by a difference between the total period and a corresponding selected guard interval;

storing the delayed signal in the input RAM module; calculating a moving window average of an autocorrelation for the delayed signal over the selected guard interval;

storing the moving window average in an output RAM module of the FFT engine;

storing the recursive integration of the moving window average in an output RAM module of the FFT engine;

determining a first recursively integrated moving window average from a plurality of stored recursively integrated moving window averages; and determining the guard interval based on the first recursively integrated moving window average.

* * * * *